United States Patent
Edagawa et al.

(10) Patent No.: US 9,522,829 B2
(45) Date of Patent: Dec. 20, 2016

(54) LIQUID TREATMENT METHOD AND LIQUID TREATMENT DEVICE USED THEREIN

(71) Applicant: Panasonic Intellectual Property Management Co., Ltd., Osaka-shi, Osaka (JP)

(72) Inventors: Akiyoshi Edagawa, Hyogo (JP); Hiroshi Yamamoto, Osaka (JP); Hideki Nagaoka, Nara (JP); Hidenori Funakoshi, Osaka (JP); Takuya Kotanagi, Osaka (JP); Takashi Sakakibara, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/774,453

(22) PCT Filed: Mar. 11, 2014

(86) PCT No.: PCT/JP2014/001381
§ 371 (c)(1),
(2) Date: Sep. 10, 2015

(87) PCT Pub. No.: WO2014/141698
PCT Pub. Date: Sep. 18, 2014

(65) Prior Publication Data
US 2016/0039689 A1    Feb. 11, 2016

(30) Foreign Application Priority Data

Mar. 12, 2013    (JP) .................. 2013-049404

(51) Int. Cl.
*C02F 1/38*    (2006.01)
*C02F 1/50*    (2006.01)
(Continued)

(52) U.S. Cl.
CPC .............. *C02F 1/50* (2013.01); *B63J 4/002* (2013.01); *C02F 1/38* (2013.01); *C02F 1/385* (2013.01);
(Continued)

(58) Field of Classification Search
CPC .............. B63J 4/002; C02F 1/385; C02F 1/50; C02F 1/38; C02F 1/4674; C02F 2103/008; C02F 2103/08; C02F 2303/04; C02F 1/76; C02F 1/70; C02F 1/34; C02F 1/32; C02F 1/07; C02F 1/46; C25B 1/26; B63B 13/00
See application file for complete search history.

(56) References Cited

U.S. PATENT DOCUMENTS

2008/0164217 A1    7/2008    Nishizawa et al.
2009/0127207 A1*   5/2009    Okamoto ................ B63B 13/00
                                                                210/747.6
2015/0274563 A1   10/2015    Yamamoto et al.

FOREIGN PATENT DOCUMENTS

CN    1842495 A    10/2006
CN    101193824 A    6/2008
(Continued)

OTHER PUBLICATIONS

International Search Report, and English language translation thereof, in corresponding International Application No. PCT/JP2014/001381, dated May 27, 2014, 4 pages.
(Continued)

*Primary Examiner* — Joseph Drodge
*Assistant Examiner* — Cameron J Allen
(74) *Attorney, Agent, or Firm* — Brinks Gilson & Lione (57) ABSTRACT

A novel method and device for treating a liquid are provided, wherein a concentrated liquid recovered using a centrifugal separation method can be utilized as ballast water. The
(Continued)

present disclosure relates to a method for treating a liquid that comprises a storage step including carrying out a physical treatment using a centrifugal force with respect to a supply liquid to be supplied to a storage means located inside a housing, wherein the method comprises carrying out an aquatic organism-inactivating treatment contained in a concentrated liquid obtained by the physical treatment using a centrifugal force and supplying to the storage means the concentrated liquid subjected to the aquatic organism-inactivating treatment.

6 Claims, 3 Drawing Sheets

(51) Int. Cl.
- *B63J 4/00* (2006.01)
- *C02F 1/467* (2006.01)
- *C25B 1/26* (2006.01)
- *C02F 103/00* (2006.01)
- *C02F 103/08* (2006.01)

(52) U.S. Cl.
CPC ............... *C02F 1/4674* (2013.01); *C25B 1/26* (2013.01); *C02F 2103/008* (2013.01); *C02F 2103/08* (2013.01); *C02F 2209/29* (2013.01); *C02F 2303/04* (2013.01)

(56) References Cited

FOREIGN PATENT DOCUMENTS

| | | |
|---|---|---|
| CN | 104755432 A | 7/2015 |
| JP | 5-157489 A | 6/1993 |
| JP | 11-90432 A | 4/1999 |
| JP | 2006-729 A | 1/2006 |
| JP | 2007-90144 A | 4/2007 |
| JP | 2008-188506 A | 8/2008 |
| JP | 2012-20218 A | 2/2012 |
| WO | WO 2014/064942 A1 | 5/2014 |

OTHER PUBLICATIONS

Office Action and English language translation of Search Report, in corresponding Chinese Application No. 201480014395.9, dated Jul. 20, 2016, 15 pages.

* cited by examiner

LIQUID TREATMENT METHOD AND LIQUID TREATMENT DEVICE USED THEREIN

This application is a 371 application of PCT/JP2014/001381 having an international filing date of Mar. 11, 2014, which claims priority to JP 2013-049404 filed Mar. 12, 2013, the entire contents of which are incorporated herein by reference.

TECHNICAL FIELD

The present disclosure relates to a method for treating a liquid and device for treating a liquid used therein.

BACKGROUND ART

When ships such as tankers, large cargo ships, etc. sail with no oil or cargoes or with a small amount thereof being loaded, generally they sail with ballast water stored in a ballast tank to ensure the stability and balance of the ships. Usually, the ballast water is loaded thereunto by pumping up, for example, seawater at the port of discharge and is discharged at the port of loading. Thus, since, for example, seawater of the port of discharge is used for the ballast water, the ballast water contains, for example, aquatic microorganisms living around the port of discharge, and the aquatic microorganisms are discharged together with the ballast water at the port of loading. Therefore, when being loaded into a ship, ballast water is treated, for example, to separate/remove foreign matters contained in a liquid taken in, using a centrifugal separation method (for example, Patent Document 1).

PRIOR ART DOCUMENTS

Patent Document

[Patent Document 1] JP 2007-90144 A

DISCLOSURE OF INVENTION

Problem to be Solved by the Invention

A concentrated liquid containing foreign matters separated using a centrifugal separation method is recovered and generally is discharged suitably outside the ship. However, the concentrated liquid that has been recovered contains not only foreign matters but also water. That is, although the water contained in the concentrated liquid was taken into the ship, it is discharged outside the ship without being utilized as ballast water. On the other hand, if the concentrated liquid can be used as ballast water without being discharged outside, it is expected that the efficiency of storing ballast water can be improved. Thus, a novel method and device for treating a liquid are provided, wherein a concentrated liquid recovered using a centrifugal separation method can be utilized as ballast water.

Means for Solving Problem

In one or more aspects, the present disclosure relates to a method for treating a liquid that includes a storage step including carrying out a physical treatment using a centrifugal force with respect to a supply liquid to be supplied to a storage means located inside a housing, wherein the method includes carrying out an aquatic organism-inactivating treatment contained in a concentrated liquid obtained by the physical treatment using the centrifugal force and supplying to the storage means the concentrated liquid that has been subjected to the aquatic organism-inactivating treatment.

Furthermore, in one or more aspects, the present disclosure relates to a device for treating a liquid including a physical means for carrying out a physical treatment using a centrifugal force with respect to a supply liquid to be supplied to a storage means located inside a housing, a recovery means for recovering a concentrated liquid obtained by the physical treatment, and a supply means for supplying a substance that inactivates aquatic organisms to the recovery means.

Effects of the Invention

According to the present disclosure, since a concentrated liquid that generally is discharged outside the ship during ballasting can be utilized as ballast water, for example, the efficiency of storing ballast water can be improved.

DETAILED DESCRIPTION OF THE PREFERRED EMBODIMENTS

The present disclosure can relate to following one or more embodiments.

<1> A method for treating a liquid that includes a storage step including carrying out a physical treatment using a centrifugal force with respect to a supply liquid to be supplied to a storage means located inside a housing, wherein the method includes carrying out an aquatic organism-inactivating treatment contained in a concentrated liquid obtained by the physical treatment using the centrifugal force and supplying to the storage means the concentrated liquid that has been subjected to the aquatic organism-inactivating treatment.

<2> The method according to the item <1>, wherein the aquatic organism-inactivating treatment includes mixing a substance that inactivates the aquatic organisms into the concentrated liquid.

<3> The method according to the item <2>, wherein the supply liquid is seawater and the substance that inactivates the aquatic organisms is freshwater.

<4> The method according to the item <2>, wherein the substance that inactivates the aquatic organisms is a chlorine-containing substance.

<5> The method according to the item <4>, wherein the method includes electrolyzing the supply liquid and/or concentrated liquid to produce the chlorine-containing substance.

<6> A device for treating a liquid, including: a physical means for carrying out a physical treatment using a centrifugal force with respect to a supply liquid to be supplied to a storage means located inside a housing; a recovery means for recovering a concentrated liquid obtained by the physical treatment; and a supply means for supplying to the recovery means a substance that inactivates aquatic organisms.

In one or more embodiments that are not particularly limited, examples of the "housing" in the present disclosure include ships and preferably ships in general that are equipped with a ballast tank. In one or more embodiments that are not particularly limited, examples of the ships in general that are equipped with a ballast tank include container ships, roll-on/roll-off ships, tankers, bulk carriers, chemical ships, and car carriers. In the present disclosure, the "storage means located inside a housing" is not limited as long as it is disposed inside a housing and capable of storing at least a liquid, and in one or more embodiments that are not particularly limited, examples thereof include ballast tanks and bilge tanks.

In one or more embodiments that are not particularly limited, the "supply liquid to be supplied to a storage means" in the present disclosure is a liquid that is taken in from outside a housing and is supplied to a storage means, and examples thereof include a liquid that is stored in a ballast tank as ballast water. In one or more embodiments that are not particularly limited, examples of the liquid that is taken in from outside a housing include seawater, brackish water, and freshwater. In one or more embodiments, the "storage step" in the present disclosure refers to a step of storing a liquid in the storage means located inside a housing.

In one or more embodiments, examples of "aquatic organisms" in the present disclosure include microorganisms living in the sea, a river, a lake, etc. and in addition, relatively micro-sized aquatic organisms such as yeast, mold, phytoplankton or zooplankton, eggs and spores of planktons, bacteria, fungi, viruses, algae, larvae of shellfishes such as conches and bivalves, larvae of crustaceans such as crabs, etc. Furthermore, examples thereof can include microorganisms and the above-mentioned aquatic organisms that may live in an estuary, a river, a canal, etc. that are connected to the sea.

In one or more embodiments that are not particularly limited, examples of the "physical treatment using a centrifugal force" in the present disclosure include separating or collecting, from a supply liquid, at least part of aquatic organisms contained in the supply liquid, using a centrifugal force and recovering a concentrated liquid containing the aquatic organisms thus separated or collected. In one or more embodiments, the physical treatment using a centrifugal force can be carried out by, for example, stirring a supply liquid using a centrifugal force and separating the supply liquid into a supernatant and a concentrated liquid using a centrifugal force. In one or more embodiments, stirring of the supply liquid using a centrifugal force can be carried out using a line mixer. In one or more embodiments, separation of the supply liquid using a centrifugal force can be carried out using a liquid cyclone. In one or more embodiments, the "supernatant" in the present disclosure refers to a separated liquid with a lower solid content concentration selected from the separated liquids obtained by a treatment for separating the supply liquid using a centrifugal force. In one or more embodiments, the "concentrated liquid" in the present disclosure refers to a separated liquid with a higher solid content concentration than that of the supernatant, which is selected from the separated liquids obtained by the treatment for separating the supply liquid using a centrifugal force. In one or more embodiments, examples of the solid contents include aquatic organisms with a shell whose height is at least 50 µm and/or aquatic organisms with a shell whose aspect ratio (shell length/shell height) is 0.1 to 10, as well as scales.

In one or more embodiments, the "aquatic organism-inactivating treatment" in the present disclosure refers to, for example, destroy, annihilate, kill or wound, kill, or sterilize at least a part of aquatic organisms contained in the concentrated liquid obtained by the physical treatment using a centrifugal force, preferably, for example, to destroy, annihilate, kill or wound, or sterilize using a substance that inactivates at least a part of aquatic organisms contained in the concentrated liquid. In one or more embodiments that are not limited, the aquatic organism-inactivating treatment can be carried out by, for example, mixing a substance that inactivates aquatic organisms into a concentrated liquid, electrolyzing a concentrated liquid to produce a substance that inactivates aquatic organisms, or irradiating a concentrated liquid with ultraviolet rays. In one or more embodiments, examples of the "substance that inactivates aquatic organisms (hereinafter also referred to as an "inactivating substance")" in the present disclosure include freshwater, hydrogen peroxide, ozone, a chlorine-containing substance, and reactive oxygen species. When the supply liquid to be supplied to a storage means is seawater, the inactivating substance is preferably freshwater in terms of reducing the corrosion of, for example, pipes which accompanies the aquatic organism-inactivating treatment. The freshwater refers to, for example, those with a salt concentration of less than 0.05% and examples thereof can include desalted water. In one or more embodiments, examples of the freshwater include drinking water, spring water, and industrial water. In one or more embodiments, examples of the chlorine-containing substance include substances containing, for example, hypochlorous acid, chlorous acid, and chloric acid as well as ions and salts thereof.

Hereinafter, the present disclosure is described in detail with reference to preferred embodiments. However, the present disclosure is not limited to the following embodiments.

Embodiment 1

Figure 1:
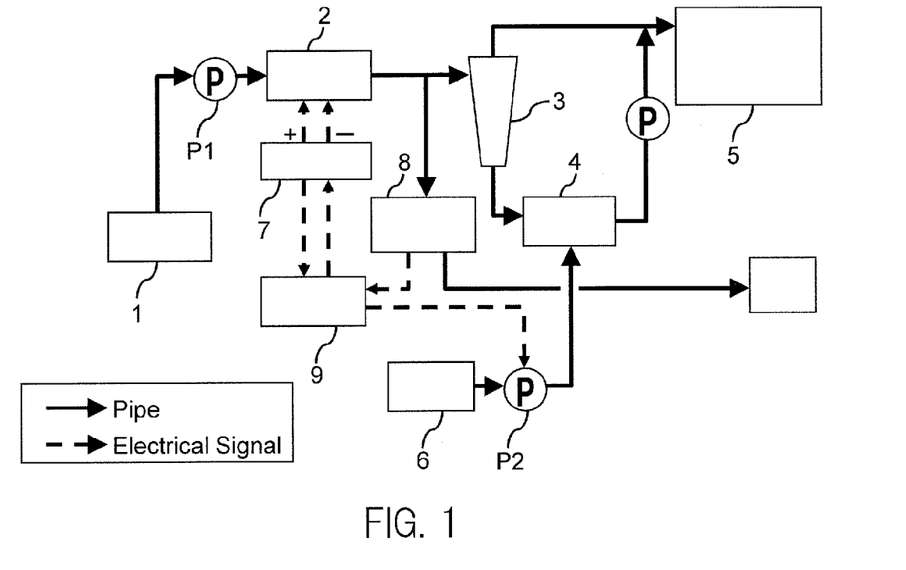
FIG. 1 is a schematic block diagram that is used for describing a method for treating ballast water in Embodiment 1.

FIG. 1 is a schematic diagram for describing a method for treating a liquid in Embodiment 1 of the present disclosure. The method for treating a liquid in Embodiment 1 of the present disclosure is an embodiment of the method of carrying out a treatment for inactivating marine organisms contained in a concentrated liquid using drinking water, wherein a supply liquid is seawater and an inactivating substance is the drinking water.

As shown in FIG. 1, a device for treating that is used for the method for treating a liquid of Embodiment 1 includes an electrolysis unit 2, a centrifugal separator 3, and a concentrated liquid storage tank 4 for storing a concentrated liquid that is recovered from the centrifugal separator 3. The electrolysis unit 2 is connected to a ballast pump P1 at its one end and to a ballast tank 5 through the centrifugal separator 3 at its other end. The concentrated liquid storage tank 4 is connected to the centrifugal separator 3 at its one end and to the ballast tank 5 through a pump at its other end. Furthermore, a drinking water tank 6 in which drinking water that is used as an inactivating substance is stored is connected to the concentrated liquid storage tank 4 through a feeding pump.

In one or more embodiments that are not particularly limited, the electrolysis unit 2 is provided with an electrolytic cell that is connected with a power unit 7. In one or more embodiments that are not particularly limited, the electrolytic cell is configured in such a manner that a plurality of electrodes (for example, an anode and a cathode) are arranged therein, the electrodes are electrically connected to the power unit and are supplied with a direct current voltage, and thereby electrolysis is carried out. The shape of the electrodes is not particularly limited and can be any one of a rectangular shape, a circular shape, a cylindrical shape, etc., and the electrode surface may be flat-shaped or mesh-shaped. The electrode material is not particularly limited but is preferably titanium or stainless steel. In one or more embodiments that are not particularly limited, it is preferable that the anode be coated with a platinum-based metal composite alloy. The voltage between the electrodes in the electrolysis unit 2 is not particularly limited but in one or more embodiments, the voltage between the electrodes is 5 to 500 V per $m^2$ of electrode area. Preferably, the electrolysis is carried out with respect to the whole amount of ballast water (the liquid to be supplied to the ballast tank 5). It is possible to carry out the electrolysis with respect to part of the ballast water to produce a chlorine-containing substance and then feed it into the rest of the ballast water. In this case, however, a higher concentration of chlorine compounds must be produced as compared to the case where the electrolysis is carried out with respect to the whole amount of ballast water, and the electrolysis unit 2 is required to carry out a circulating treatment and a cooling treatment. Furthermore, a feeder for feeding the substance to the rest of the ballast water is additionally required.

The device for treating a liquid shown in FIG. 1 is configured as follows. That is, a liquid taken in from outside a housing is treated by the electrolysis unit 2 and then is separated into a supernatant and a concentrated liquid by a physical treatment using a centrifugal force that is carried out by the centrifugal separator 3, and the supernatant is supplied to the ballast tank 5 while the concentrated liquid is supplied to the concentrated liquid storage tank 4. The concentrated liquid stored in the concentrated liquid storage tank 4 is mixed with drinking water supplied from the drinking water tank 6 and thereby the aquatic organisms contained in the concentrated liquid are inactivated. The concentrated liquid subjected to the treatment for inactivating the aquatic organisms is supplied to the ballast tank 5. According to the method for treating a liquid of Embodiment 1, since drinking water is used as the inactivating substance, the marine organisms contained in the concentrated liquid can be annihilated by, for example, a change in osmotic pressure to be inactivated. Furthermore, since the drinking water contains hypochlorous acid, an effect of the inactivating treatment with the hypochlorous acid in addition to the change in osmotic pressure also is expected.

In a pipe that connects the electrolysis unit 2 and the centrifugal separator 3 to each other, a hypochlorous acid concentration meter 8 is disposed so that the hypochlorous acid concentration of the liquid in the pipe can be measured. The hypochlorous acid concentration meter 8 is connected to a control unit 9, and the power unit 7 connected to the electrolysis unit 2 is controlled by the control unit 9 based on the hypochlorous acid concentration measured by the hypochlorous acid concentration meter 8. Furthermore, a drinking water feeding pump P2 is controlled by the control unit 9.

In terms of improving the efficiency of the treatment for inactivating marine organisms, the concentrated liquid storage tank 4 may be provided with a diffuser pipe capable of bubbling, for example, nitrogen gas. In terms of improving the efficiency of the treatment for inactivating marine organisms, the concentrated liquid storage tank 4 may be provided with a stirring means such as a propeller at the bottom of the tank.

An embodiment of the method for treating a liquid (ballast water) using the device for treating a liquid shown in FIG. 1 is described.

First, seawater taken in from outside a housing through a sea chest 1 by the ballast pump P1 is introduced into the electrolysis unit 2 and the seawater is electrolyzed in the electrolysis unit 2. The electrolysis allows hypochlorous acid to be produced in the seawater, and the aquatic organism-inactivating treatment contained in the seawater is carried out with the hypochlorous acid. The electrolysis may be carried out while measuring the hypochlorous acid concentration of the treated liquid discharged from the electrolysis unit 2 using the hypochlorous acid concentration meter 8 or while monitoring the concentration of the hypochlorous acid in the ballast water stored in the ballast tank 5. It is preferable that the electrolysis be carried out so that for example, the hypochlorous acid concentration of the treated liquid discharged from the electrolysis unit 2 is at least 0.1 mg/L and it is 20 mg/L or less in terms of reducing the impact on coatings of pipes, the storage means, etc. In one or more embodiments, mixing of a chlorine-containing substance into a liquid to be treated may include controlling the concentration of the chlorine-containing substance to be 0.1 to 20 mg/L. Furthermore, for example, it may include controlling the electrolysis unit 2 so that the hypochlorous acid concentration of the ballast water stored in the ballast tank 5 is 0.1 to 20 mg/L.

Next, the seawater that has been electrolyzed in the electrolysis unit 2 is introduced into the centrifugal separator 3. In the centrifugal separator 3, a stirring-separation treatment is carried out using a centrifugal force to separate the seawater into a supernatant and a concentrated liquid. Then, the supernatant and the concentrated liquid are supplied to the ballast tank 5 and the concentrated liquid storage tank 4, respectively. With the physical treatment using a centrifugal force, for example, aquatic organisms that tend not to be inactivated by the electrolysis treatment using the electrolysis unit 2 can be separated or collected efficiently.

In one or more embodiments that are not particularly limited, examples of the centrifugal separator 3 include a liquid cyclone. A case where a liquid cyclone is used is described as an example below. In one or more embodiments, the maximum amount of the liquid to be treated in a liquid cyclone is not particularly limited but is preferably 1 to 10000 $m^3$/hr and further preferably 10 to 1000 $m^3$/hr in terms of the installation space inside a ship. When a larger amount of the liquid to be treated than that is required, it is preferable to install a plurality of liquid cyclones in parallel. In one or more embodiments, the casing size of the liquid cyclone is not particularly limited but is preferably 0.001 to 0.1 m in diameter and 0.003 to 0.3 m in height per amount of a liquid to be treated of 1 $m^3$/hr in terms of the installation space inside a ship. In one or more embodiments, the difference between the inlet pressure and the outlet pressure in the liquid cyclone (hereinafter, referred to as a pressure loss) is preferably 0.01 to 1 MPa and further preferably 0.01 to 0.1 MPa in terms of the required pump head of the pump for delivering a supply liquid to the liquid cyclone. In one or more embodiments, the inlet flow rate in the liquid cyclone is preferably 0.1 to 100 m/sec, more preferably 1 to 10 m/sec, and further preferably at least 1 m/sec but less than 10 m/sec, in terms of obtaining sufficient separation performance by a centrifugal force and controlling the pump head required according to an increase in the pressure loss. In terms of controlling the increase in the amount of a supply liquid for obtaining a required amount of a supernatant and controlling the increase in the capacity of the pump that results therefrom, the amount of a concentrated liquid is preferably not more than 10% of that of the supply liquid.

In parallel with or independently from the supply of the supernatant from the centrifugal separator 3 to the ballast tank 5, the treatment for inactivating marine organisms contained in the concentrated liquid is carried out in the concentrated liquid storage tank 4 and the concentrated liquid thus treated is supplied to the ballast tank 5. The concentrated liquid may contain, for example, marine organisms with a shell such as shellfishes, preferably marine organisms with a shell whose height is at least 50 μm, marine organisms with a shell whose aspect ratio is 0.1 to 10, etc. Seawater generally has a salinity concentration of 3.1 to 3.8%. Therefore, in terms of an efficient treatment for inactivating marine organisms, the concentrated liquid and the drinking water are mixed together in such a manner that the salinity concentration of the mixed liquid is preferably 1.5% or less, more preferably 1.0% or less. Furthermore, although the ratio between the concentrated liquid and the drinking water can be set suitably according to the salinity concentration of the concentrated liquid, in one or more embodiments, the concentrated liquid and the drinking water are mixed together in such a manner that the ratio between the concentrated liquid and the drinking water is preferably 1:1.06 to 1.53, more preferably 1:2.1 to 2.8. Moreover, it has been confirmed that when the ratio between the concentrated liquid and the drinking water was set at approximately 1:1.75, the marine organisms contained in the concentrated liquid were inactivated (no data is shown). In terms of improving the efficiency of the treatment for inactivating marine organisms, it is preferable that the concentrated liquid and the drinking water be mixed together in such a manner that the salinity concentration of the concentrated liquid is changed rapidly and thereby the osmotic pressure of the marine organisms contained in the concentrated liquid is changed rapidly.

In the present embodiment, the case where drinking water is used as the inactivating substance was described as an example, but the present embodiment is not limited thereto and the inactive substance may be freshwater (for example, industrial water) other than drinking water. Furthermore, in the present embodiment, the case where drinking water is added to the concentrated liquid storage tank 4 to carry out the treatment for inactivating marine organisms was described as an example, but the present embodiment is not limited thereto, and the concentrated liquid and drinking water may be mixed together using, for example, an in-line mixer to carry out the treatment.

Embodiment 2

Figure 2:
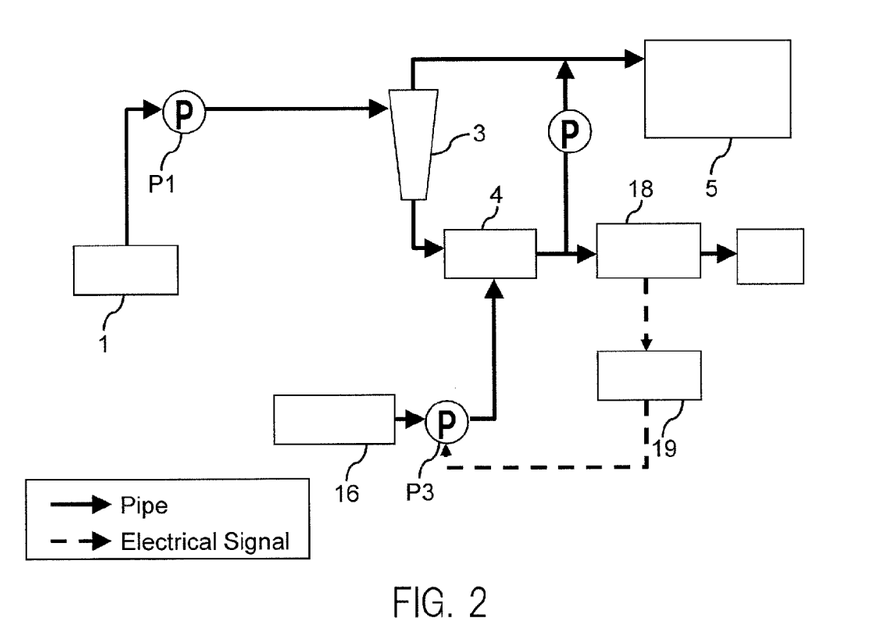
FIG. 2 is a schematic block diagram that is used for describing a method for treating ballast water in Embodiment 2.

FIG. 2 is a schematic diagram for describing a method for treating a liquid in Embodiment 2 of the present disclosure. The method for treating a liquid in Embodiment 2 of the present disclosure is an embodiment of the method of carrying out an aquatic organism-inactivating treatment contained in a concentrated liquid using hypochlorous acid.

As shown in FIG. 2, a device for treating that is used for the method for treating a liquid of Embodiment 2 includes a centrifugal separator 3, a concentrated liquid storage tank 4 for storing a concentrated liquid that is recovered from the centrifugal separator 3, and a hypochlorous acid tank 10. The centrifugal separator 3 is connected to a ballast pump P1 at its one end and to a ballast tank 5 at its other end. The concentrated liquid storage tank 4 is connected to the centrifugal separator 3 at its one end and to the ballast tank 5 through a pump at its other end. Furthermore, a hypochlorous acid tank 16 in which hypochlorous acid that is used as an inactivating substance is stored is connected to the concentrated liquid storage tank 4 through a feeding pump P3. In the device for treating of Embodiment 2, the centrifugal separator 3 can be the same as that used in Embodiment 1.

The device for treating a liquid shown in FIG. 2 is configured as follows. That is, a liquid taken in from outside a housing is separated into a supernatant and a concentrated liquid by a physical treatment using a centrifugal force that is carried out by the centrifugal separator 3, the supernatant is supplied to the ballast tank 5, and the concentrated liquid is supplied to the concentrated liquid storage tank 4. The concentrated liquid stored in the concentrated liquid storage tank 4 is mixed with the hypochlorous acid supplied from the hypochlorous acid tank 16, and thereby aquatic organisms contained in the concentrated liquid are inactivated. The concentrated liquid that has been subjected to the inactivating treatment is supplied to the ballast tank 5.

In a pipe that connects the concentrated liquid storage tank 4 and the ballast tank 5 to each other, a hypochlorous acid concentration meter 18 is disposed so that the hypochlorous acid concentration of the liquid in the pipe can be measured. The hypochlorous acid concentration meter 18 is connected to a control unit 19, and the hypochlorous acid feeding pump P3 is controlled by the control unit 19 based on the hypochlorous acid concentration measured by the hypochlorous acid concentration meter 18. In terms of improving the efficiency of the treatment for inactivating marine organisms, the concentrated liquid storage tank 4 may be provided with a diffuser pipe capable of bubbling, for example, nitrogen gas.

An embodiment of the method for treating a liquid (ballast water) using the device for treating a liquid shown in FIG. 2 is described.

First, a liquid taken in from outside a housing by the ballast pump P1 is introduced into the centrifugal separator 3 and is subjected to a stirring-separation treatment using a centrifugal force to be separated into a supernatant and a concentrated liquid. The supernatant and the concentrated liquid are supplied to the ballast tank 5 and the concentrated liquid storage tank 4, respectively. The treatment that is carried out by the centrifugal separator 3 can be carried out in the same manner as in Embodiment 1.

In parallel with or independently from the supply of the supernatant from the centrifugal separator 3 to the ballast tank 5, the treatment for inactivating marine organisms contained in the concentrated liquid is carried out in the concentrated liquid storage tank 4 and the concentrated liquid thus treated is supplied to the ballast tank 5. In one or more embodiments, it is preferable that hypochlorous acid be mixed into the concentrated liquid in such a manner that the mixed liquid has a hypochlorous acid concentration of at least 20 mg/L, and in such a manner that the mixed liquid has a hypochlorous acid concentration of 20 to 20000 mg/L in terms of the efficiency of the inactivating treatment and reducing the impact on coatings of, for example, tanks. The duration for mixing the concentrated liquid and the hypochlorous acid together is one minute to ten hours, preferably five minutes to five hours, in terms of the efficiency of the inactivating treatment and the size of the concentrated liquid storage tank.

In FIG. 2, the configuration in which a liquid taken in from outside a housing is supplied to the centrifugal separator 3 from the ballast pump P1 was described as an example. However, the present embodiment is not limited thereto. For example, an electrolysis unit may be disposed between the ballast pump P1 and the centrifugal separator 3. Furthermore, the hypochlorous acid tank 16 may be replaced with a configuration in which hypochlorous acid is produced by the electrolysis unit to be supplied to the concentrated liquid storage tank 4.

Embodiment 3

Figure 3:
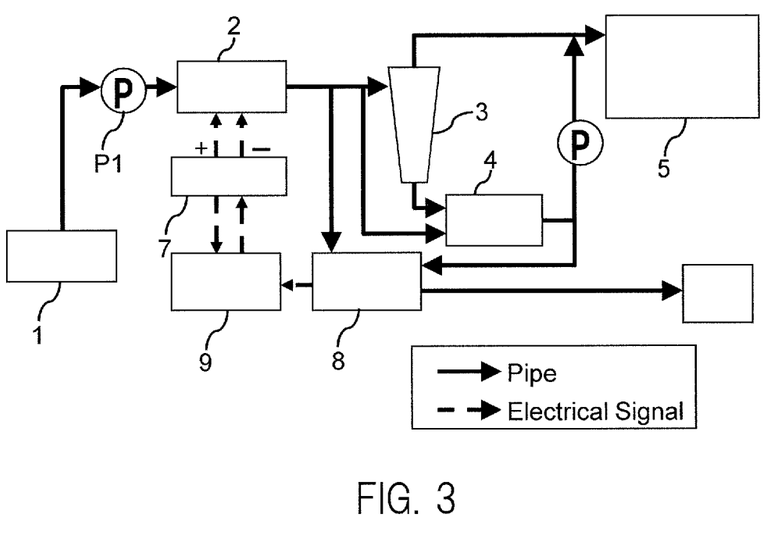
FIG. 3 is a schematic block diagram that is used for describing a method for treating ballast water in Embodiment 3.

FIG. 3 is a schematic diagram for describing a method for treating a liquid in Embodiment 3 of the present disclosure. The method for treating a liquid in Embodiment 3 of the present disclosure is an embodiment of the method of carrying out an aquatic organism-inactivating treatment contained in a concentrated liquid using hypochlorous acid.

As shown in FIG. 3, a device for treating that is used for the method for treating a liquid of Embodiment 3 has the same configuration as that of the device for treating of Embodiment 1 except that the device for treating is configured in such a manner that a pipe connecting an electrolysis unit 2 and a centrifugal separator 3 to each other is branched to be capable of supplying hypochlorous acid produced in the electrolysis unit 2 to a concentrated liquid storage tank 4, and the concentrated liquid storage tank 4 is not connected to a drinking water tank.

An embodiment of the method for treating a liquid (ballast water) using the device for treating a liquid shown in FIG. 3 is described.

First, a liquid taken in from outside a housing by a ballast pump P1 is introduced into the electrolysis unit 2 and seawater is electrolyzed in the electrolysis unit 2. The treatment that is carried out by the electrolysis unit 2 can be carried out in the same manner as in Embodiment 1. Next, the seawater electrolyzed in the electrolysis unit 2 is introduced into the centrifugal separator 3. The treatment that is carried out by the centrifugal separator 3 can be carried out in the same manner as in Embodiment 1.

In parallel with or independently from the supply of the supernatant from the centrifugal separator 3 to a ballast tank 5, the treatment for inactivating marine organisms contained in the concentrated liquid is carried out in the concentrated liquid storage tank 4 and the concentrated liquid thus treated is supplied to the ballast tank 5. In one or more embodiments, the control of the pipe, which connects the electrolysis unit 2 and the centrifugal separator 3 to each other, to the concentrated liquid storage tank 4 can be carried out using an electric valve, a three-way valve, etc. In one or more embodiments, the concentration of the hypochlorous acid to be supplied to the concentrated liquid storage tank 4 is at least 21 mg/L and in terms of the efficiency of the inactivating treatment and reducing the impact on coatings of, for example, tanks, the concentration is 21 to 21000 mg/L. Furthermore, it is preferable that the hypochlorous acid be supplied to the concentrated liquid storage tank 4 in such a manner that the hypochlorous acid concentration (the concentration obtained after the concentrated liquid and the hypochlorous acid are mixed together) in the concentrated liquid storage tank 4 is at least 20 mg/L and in such a manner that the hypochlorous acid concentration is 20 to 20000 mg/L in terms of the efficiency of the inactivating treatment and reducing the impact on coatings of, for example, tanks.

The duration for mixing the concentrated liquid and the hypochlorous acid together is one minute to ten hours, preferably five minutes to five hours, in terms of the efficiency of the inactivating treatment and the size of the concentrated liquid storage tank.

Embodiment 4

Figure 4:
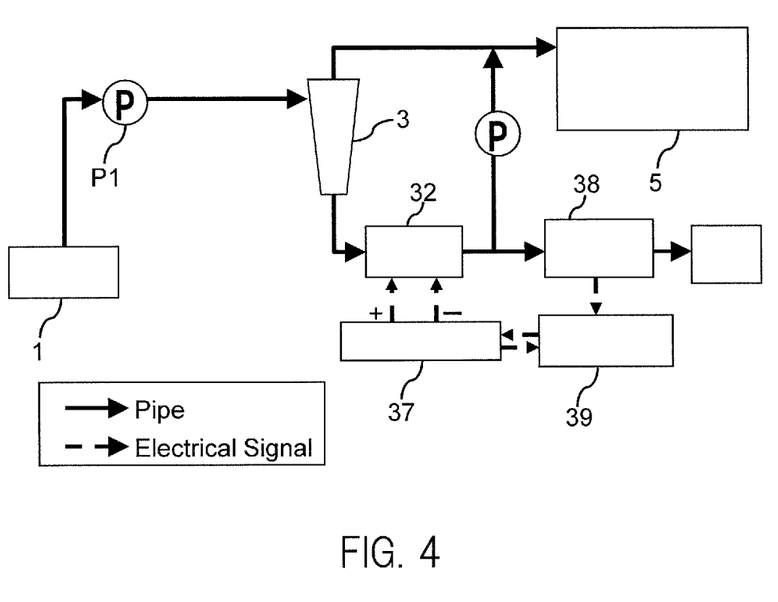
FIG. 4 is a schematic block diagram that is used for describing a method for treating ballast water in Embodiment 4.

FIG. 4 is a schematic diagram for describing a method for treating a liquid in Embodiment 4 of the present disclosure. The method for treating a liquid in Embodiment 4 of the present disclosure is an embodiment of the method of carrying out an aquatic organism-inactivating treatment contained in a concentrated liquid using hypochlorous acid.

As shown in FIG. 4, a device for treating that is used for the method for treating a liquid of Embodiment 4 has the same configuration as that of the device for treating of Embodiment 2 except that the concentrated liquid is supplied to an electrolysis unit 32 instead of the concentrated liquid storage tank 4 and the concentrated liquid is subjected to an electrolysis treatment in the electrolysis unit 32 to be subjected to the inactivating treatment. According to the present embodiment, since the concentrated liquid is directly electrolyzed to produce hypochlorous acid, the effectiveness of sterilizing aquatic organisms can be further improved and thereby the efficiency of the aquatic organism-inactivating treatment contained in the concentrated liquid can be further improved.

An embodiment of the method for treating a liquid (ballast water) using the device for treating a liquid shown in FIG. 4 is described.

First a liquid taken in from outside a housing by a ballast pump P1 is introduced into a centrifugal separator 3 and is subjected to a stirring-separation treatment using a centrifugal force to be separated into a supernatant and a concentrated liquid. Then, the supernatant and the concentrated liquid are supplied to a ballast tank 5 and the electrolysis unit 32, respectively. The treatment that is carried out by the centrifugal separator 3 can be carried out in the same manner as in Embodiment 1.

In the electrolysis unit 32, the concentrated liquid is electrolyzed to produce hypochlorous acid therein and thereby the aquatic organism-inactivating treatment is carried out. The electrolysis unit 32 is connected with a power unit 37. The power unit 37 is controlled by a control unit 39 based on the hypochlorous acid concentration measured by a hypochlorous acid concentration meter 38. In one or more embodiments, it is preferable that the electrolysis treatment be carried out in such a manner that the hypochlorous acid concentration is at least 20 mg/L and in such a manner that the hypochlorous acid concentration is 20 to 20000 mg/L in terms of the efficiency of the inactivating treatment and reducing the impact on coatings of, for example, tanks. The duration for mixing the concentrated liquid and the hypochlorous acid together is one minute to ten hours, preferably five minutes to five hours, in terms of the efficiency of the inactivating treatment.

Embodiment 5

Figure 5:
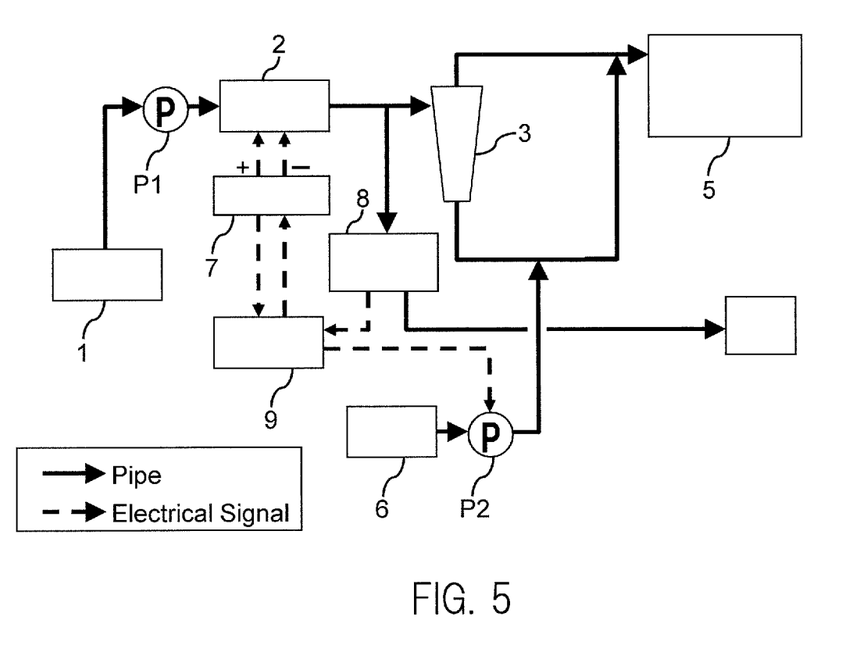
FIG. 5 is a schematic block diagram that is used for describing a method for treating ballast water in Embodiment 5.

FIG. 5 is a schematic diagram for describing a method for treating a liquid in Embodiment 5 of the present disclosure. The method for treating a liquid in Embodiment 5 of the present disclosure is an embodiment of the method of carrying out an aquatic organism-inactivating treatment contained in a concentrated liquid using drinking water, wherein a supply water is seawater and an inactivating substance is the drinking water.

As shown in FIG. 5, a device for treating that is used for the method for treating a liquid of Embodiment 5 has the same configuration as that of the device for treating of Embodiment 1 except that it is configured in such a manner that a concentrated liquid storage tank 4 is not provided and a concentrated liquid that is recovered from a centrifugal separator 3 is supplied to a ballast tank 5, and a drinking water tank 6 in which drinking water to be used as an inactivating substance is stored is connected through a pump to the pipe that connects the centrifugal separator 3 and the ballast tank 5 to each other.

According to the method for treating a liquid of Embodiment 5, it is configured in such a manner that the drinking water tank 6 is connected to the pipe connected to the centrifugal separator 3 and drinking water can be fed directly to the pipe. Thus, since the drinking water is fed into a vortex of the concentrated liquid discharged from the centrifugal separator 3, the stirring effect of the swirling flow generated in the centrifugal separator 3 allows the drinking water to be stirred efficiently in the concentrated liquid to improve the efficiency of the inactivating treatment.

What is claimed is:

1. A method for treating a liquid, comprising:
providing a liquid cyclone and carrying out a physical treatment using a centrifugal force with respect to a supply liquid, wherein the supply liquid is separated into a concentrated liquid containing aquatic organisms and a supernatant; and
recovering the concentrated liquid and the supernatant, wherein the method further comprises:
subjecting the concentrated liquid to an aquatic organism-inactivating treatment; and
supplying the concentrated liquid that has been subjected to the aquatic organism-inactivating treatment and the supernatant to a storage means.

2. The method according to claim 1, wherein the aquatic organism-inactivating treatment comprises mixing a substance that inactivates the aquatic organisms into the concentrated liquid.

3. The method according to claim 2, wherein the supply liquid is seawater and the substance that inactivates the aquatic organisms is freshwater.

4. The method according to claim 2, wherein the substance that inactivates the aquatic organisms is a chlorine-containing substance.

5. The method according to claim 4, wherein the method comprises electrolyzing the supply liquid and/or concentrated liquid to produce the chlorine-containing substance.

6. A device for treating a liquid, comprising:
a liquid cyclone for carrying out a physical treatment using a centrifugal force with respect to a supply liquid, the physical treatment separating the supply liquid into a concentrated liquid containing aquatic organisms and a supernatant, the liquid cyclone configured to transfer the supernatant to a storage means;
a recovery means for recovering the concentrated liquid obtained from the liquid cyclone; and
a supply means for supplying to the recovery means a substance that inactivates aquatic organisms,
wherein the recovery means is configured to transfer the concentrated liquid that has been subjected to the substance that inactivates aquatic organisms to the storage means.

* * * * *